July 23, 1940.    R. R. HARRIS    2,209,270
FLUID TURBINE
Filed March 2, 1938    2 Sheets-Sheet 1
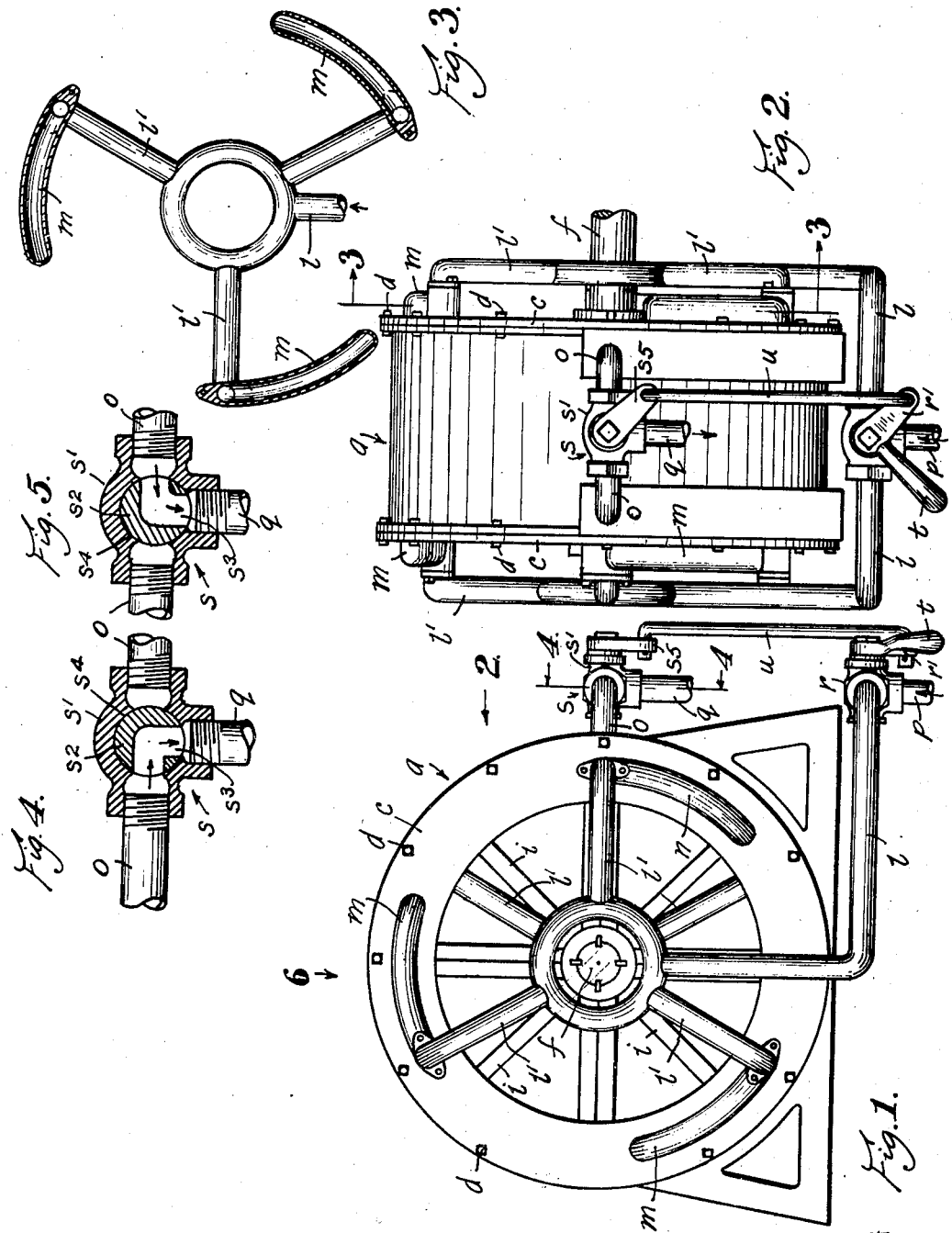
Inventor:
Romaine R. Harris
by _____ Attorney.

July 23, 1940.  R. R. HARRIS  2,209,270
FLUID TURBINE
Filed March 2, 1938  2 Sheets-Sheet 2
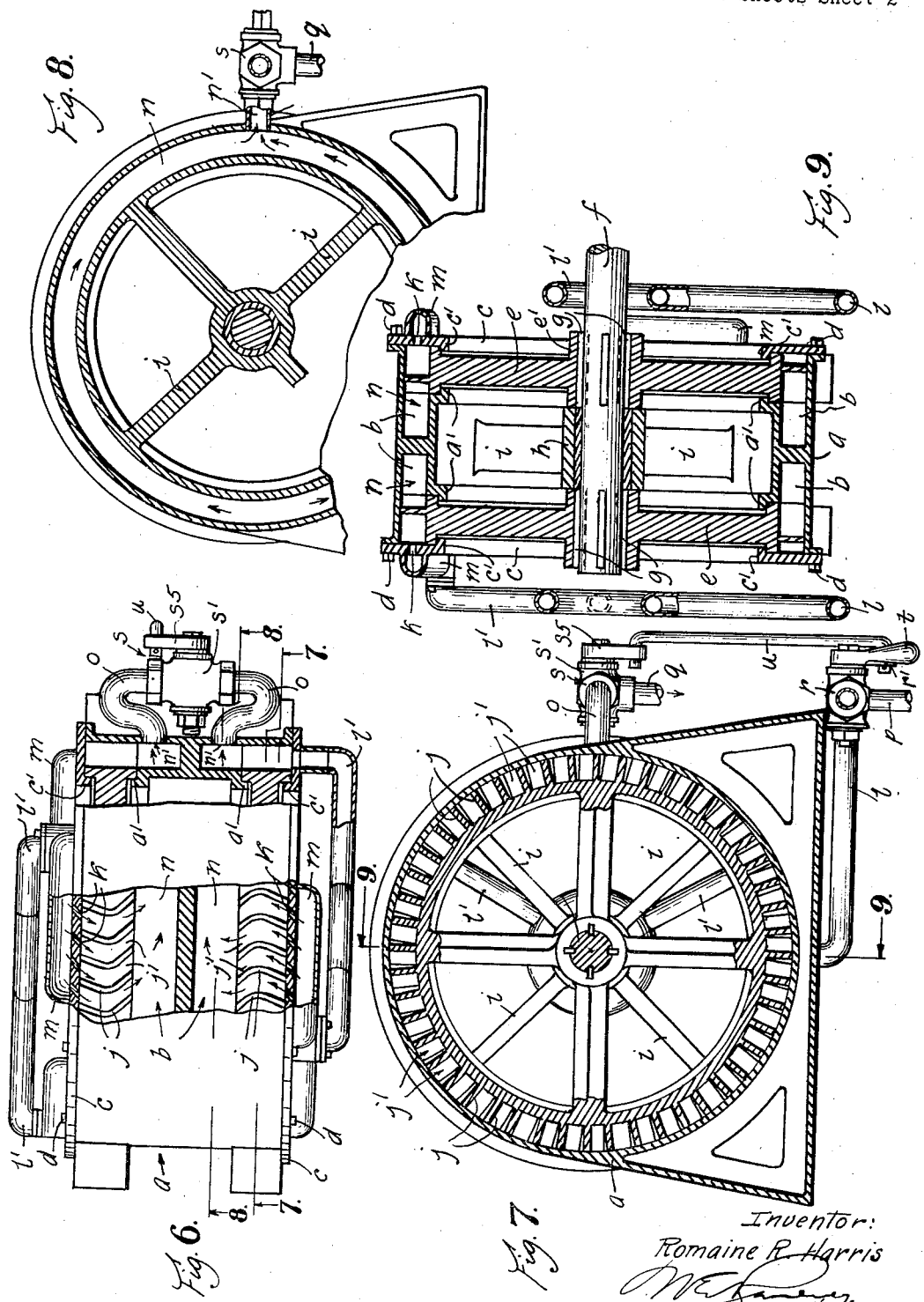
Inventor:
Romaine R. Harris
by
Attorney Patented July 23, 1940

2,209,270

UNITED STATES PATENT OFFICE 2,209,270

FLUID TURBINE

Romaine R. Harris, Portland, Oreg., assignor to
W. E. Clifton, Yakima, Wash.

Application March 2, 1938, Serial No. 193,505

2 Claims. (Cl. 253—65)

The object of my invention is to provide a turbine for use with any appropriate operating fluid, which turbine is adapted to be driven efficiently by said fluid and to be easily and quickly reversed in direction of rotation. A further object of my invention is to provide a turbine adapted for use with steam or other hot vapor which has the portions arranged so that the chambers for said fluid are spaced substantially from the journal bearing so that the journal bearing may be kept cool and lubricated and the parts adjacent said bearing will not become warped or otherwise affected adversely by the effect of the heated condition of said operating chambers.

A further object of my invention is to provide a turbine of this character with jets and peripheral grooves around the rotor portion of said turbine so that the fluid emitted from said jets will function effectively with said grooved rotors to propel the latter about their axis of rotation.

A further object of my invention is to provide a turbine of this character in which the steam may be admitted to the operating chambers and removed therefrom without the necessity of providing packed or otherwise sealed joints about the conduits therefor.

Further details of my invention and the mode of operation thereof are hereinafter described with reference to the accompanying drawings in which:

Fig. 1 is an elevation of a turbine embodying my invention, in which figure, the conduits for the ingress and egress of fluid are illustrated;

Fig. 2 is an elevation of said turbine taken in the direction of the arrow 2 in Fig. 1, illustrating particularly the manner in which control valves may be simultaneously operated to control the flow of fluid selectively to either of the operating chambers to drive the rotors in either of opposite directions of rotation, thereby to produce a reversible turbine;

Fig. 3 is a detailed section taken on the line 3—3 in Fig. 2, and illustrates the manner in which the conduits are adapted to extend over a wide angular portion of the circular face of said rotors;

Fig. 4 is a detailed sectional view taken on the line 4—4 in Fig. 1, showing the operating structure of a control valve;

Fig. 5 is a section similar to Fig. 4 and illustrates the manner in which operating fluid can be directed to either of two operating chambers to secure reversal of operation of said turbine;

Fig. 6 is a plan view, taken in the direction of the arrow 6 in Fig. 1, with portions of the frame or stator of said rotors shown broken away and in section, to disclose details of construction which would otherwise be concealed;

Fig. 7 is a sectional view taken on the line 7—7 in Fig. 6, and shows the construction and arrangement of the operating portions of the rotor housed within the stator;

Fig. 8 is a sectional view taken on the line 8—8 in Fig. 6, and illustrates the central chamber into which the operating fluid is collected as it is passed thru the grooved rotor and is returned to the fluid conduits; and Fig. 9 is a cross-sectional view taken on the line 9—9 in Fig. 7, and illustrates the manner in which a pair of rotors or a multiple rotor can be housed within a common stator and keyed to a common shaft so as to rotate said shaft selectively in opposite directions.

A turbine embodying my invention comprises a frame $a$ which also constitutes the stator of said rotor. Said frame defines two alined but spaced peripheral operating chambers $b$ arranged at opposite sides thereof. Covering said operating chambers are side members $c$ secured to said frame and lying across the open face of said peripheral chambers, being secured by studs or bolts $d$. Said side members, thus, are removably secured to the frame, and when detached, provide access into said operating chambers. Said side members also engage the outer faces of a pair of rotors $e$, fixed to a common shaft $f$, by keys $g$. Said shaft is journalled within a bearing $h$, supported within a spider $i$, constituting a part of the frame $a$, as is illustrated in Fig. 8.

Each rotor has an elongated hub $e'$ seated upon the shaft $f$, and said hub is designed to give lateral stability to said hub. Formed about the rim portion $e2$ of said rotor is a wider section upon which is arranged a series of radially extending vanes $j$, defining grooves $j'$ between them.

The faces of the frame opposing said rotors are provided with outstanding guide flanges $a'$ which engage the underface of the rim portion $e2$, and corresponding flanges $c'$ are arranged upon the side members secured to said frame and underlie the opposite face of said section $e2$. Thus the said flanges are arranged to prevent the escape of operating fluid from the peripheral operating chambers in which the rotor vanes move. It is desirable to provide relatively complicated interlocking members between the stationary part of said turbine and the rotating part thereof. I have not illustrated any such sealing members which constitute no part of my invention. Suffice it to say that said sealing members could comprise packing, opposed flanges defining a tortuous passageway thru said joints, or any other type of sealing device, as commonly practiced in the art.

Extending thru the wall of the stator and into the peripheral operating chambers are groups of obliquely inclined apertures $k$. These define jets thru which the operating fluid passes to the operating chambers directed against the faces of the vanes $j$ and passing along the grooves $j'$ in each of the rotors. I preferably arrange said grooves so that they are curved, as is illustrated in Fig. 6. The portion of the groove closest to the apertures is inclined substantially in the same general direction as the inclination of said apertures but at a slightly greater angle to the face of the stator. Said groove is curved and at the far side or discharge side thereof said groove is inclined in the opposite direction with respect to the angle at which the apertures $k$ enter the operating chamber. The arrangement of the grooves in this manner tends to permit the operating fluid to enter the grooves easily but permits the velocity of the fluid entering thru said jets to strike the faces of the vanes and drive the rotor in the direction to which said apertures are inclined. The continued movement of the fluid about said vanes tends to induce further rotation of said rotors, and I have found that the curving of said vanes in this manner tends to promote greater efficiency than if said grooves were lineal, either extending directly crosswise of the face of the rotor or being inclined angularly with respect thereto.

As I have illustrated diagrammatically in Fig. 6, the grooves on one rotor are arranged to drive said rotor in one direction, while the grooves on the other rotor are adapted to rotate it in the opposite direction. The jets are inclined likewise, and thus if operating fluid is admitted thru the jets at one side, the rotor assembly is driven in one direction, while if it is admitted thru jets at the opposite side, the direction of rotation is reversed. The operating fluid is admitted to the operating chambers $b$ thru intake conduits $l$, one arranged at each side, each conduit having a plurality of branches $l'$. Each branch terminates in an arcuate terminal $m$ adapted to overlie a plurality of jetting apertures $k$. Thus when fluid is admitted to propel a rotor, it is admitted at several different points thru the branches $l'$, and each branch is adapted to supply a number of jets so that there are a large number of jets of fluid directed upon the vanes of each rotor, and the effect thus is cumulative. Fluid passes thru said jets, along said grooves, to a central chamber $n$ for each of the rotors. A central chamber is common to all of the grooves of a rotor, as is noted in Fig. 8, and a single discharge aperture $n'$ permits the operating fluid to escape from said chamber $n$.

As is illustrated in the accompanying drawings, there are two operating chambers $b$ in connection with two rotors, and there are two central chambers, one for each rotor. Conduits $o$ lead from each of the central chambers and join at a common point. Operating fluid is supplied to said turbine thru a supply pipe $p$, and fluid is carried away from said turbine by a discharge pipe $q$. At the point where the supply pipe $p$ joins the intake conduit $l$, a control valve $r$ is arranged. A similar control valve $s$ joins the discharge pipe $q$ to the discharge conduit $o$. Said valves are similar, and in Figs. 4 and 5, I illustrate diagrammatically how a valve of this character may operate. I have shown a section thru the discharge valve $s$, but it is to be understood that the intake valve functions and is constructed similarly. Said valve comprises a body $s'$, a central tapered plug $s2$ in which is arranged an angular passageway $s3$. Said passageway may be arranged to connect the discharge pipe $q$ with the left-hand conduit $o$, as is shown in Fig. 4, or it may be rotated so that it causes said pipe $q$ to communicate with the right-hand conduit $o$. It can also be arranged so that the imperforate portion $s4$ lies across the mouth of the discharge pipe and across one of the conduits $o$, and thus flow is prevented thru the body $s'$.

I arrange a control handle $t$ upon one of said valves, and arrange arms $r'$ and $s5$, respectively, on said intake valve $r$ and discharge valve $s$. Said arms are secured to the plugs so as to cause the latter to rotate within their bodies. Said two arms are connected by a link member $u$. Thus, angular movement of one arm produces similar angular movement of the other. Thus, if it is desired to rotate the turbine in one direction, the control handle is moved angularly so that the intake conduit $l$ leading to one rotor is caused to communicate with the supply pipe $p$. Simultaneously the discharge conduit for said rotor is caused to communicate with the discharge pipe and thus a flow of operating fluid is directed thru said rotor to drive it. If said turbine is to be rotated in the opposite direction, the position of said control handle $t$ is reversed and the operating fluid is cut off from the first mentioned rotor and is permitted to act upon the rotor at the opposite side of said turbine. If it is desired to cut off the operating fluid from both sides, the operating handle is arranged so that the plugs in said valves are arranged so that the imperforate portions $s4$ of both of said plugs are adapted to overlie the supply pipe and the discharge pipe, respectively.

It is to be noted that the operating chambers, their central chambers, and the peripheral portions of the rotor, are all spaced substantially from the central bearing. The central portions of the stators, as well as the rotors, are open so that cooling air can flow freely about the bearings and between said operating chambers and the shaft portion. This tends to permit the bearings to be maintained more or less cool, that is, they are not heated unduly by the radiation of heat from said operating chambers if a heated vapor, such as steam, is used. As is illustrated in Fig. 2, conduits are spaced laterally from the sides of the stators, and it is desirable that said conduits be heavily insulated. Sections of insulation are not shown in the drawings because such would conceal other operating parts which would underlie them. It is to be assumed, however, that the portions are all heavily insulated so as to minimize radiation and other heat losses.

I claim:

1. In a fluid turbine, a shaft journalled in a frame, a stator carried by said frame, said stator defining an annular operating chamber, flanges on the portions of said stator comprising the walls of said chamber, a rotor carried by said shaft, said rotor having a laterally projecting rim adapted to be housed within said operating chamber, the inner faces of said rim being adapted to engage the outer faces of said flanges on the walls of said operating chamber to confine a fluid under pressure therein, said stator being provided with means for directing said fluid at high velocity against vanes arranged around the periphery of said rotor thereby to cause rotation of the latter.

2. In a fluid turbine, a shaft journalled in a frame, a stator carried by said frame, said stator defining an annular operating chamber, flanges on the portions of said stator comprising the walls of said chamber, a rotor carried by said shaft, said rotor having a laterally projecting rim adapted to be housed within said operating chamber, the inner and side faces of said rim being adapted to engage the outer faces of said flanges and the walls of said operating chamber to confine a fluid under pressure therein, said stator being provided with means for directing said fluid at high velocity against vanes arranged around the periphery of said rotor thereby to cause rotation of the latter.

ROMAINE R. HARRIS.